(12) United States Patent
Matthew et al.

(10) Patent No.: US 9,490,701 B2
(45) Date of Patent: Nov. 8, 2016

(54) TECHNIQUES FOR REDUCING SWITCHING NOISE AND IMPROVING TRANSIENT RESPONSE IN VOLTAGE REGULATORS

(71) Applicant: Intel Corporation, Santa Clara, CA (US)

(72) Inventors: George E. Matthew, Hillsboro, OR (US); Jessica Gullbrand, Forest Grove, OR (US); Krishnan Ravichandran, Saratoga, CA (US); Willem M. Beltman, West Linn, OR (US); Karthik Sankaranarayanan, Cumberland, RI (US); Sheldon Weng, Lake Oswego, OR (US); Wayne L. Proefrock, Hillsboro, OR (US); Harish K. Krishnamurthy, Hillsboro, OR (US); Pavan Kumar, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 4 days.

(21) Appl. No.: 14/325,310

(22) Filed: Jul. 7, 2014

(65) Prior Publication Data

US 2016/0006350 A1    Jan. 7, 2016

(51) Int. Cl.
*H02M 3/157* (2006.01)
*H02M 3/158* (2006.01)
(Continued)

(52) U.S. Cl.
CPC ............... *H02M 3/158* (2013.01); *H02M 1/44* (2013.01); *H02M 3/005* (2013.01); *H02M 3/157* (2013.01); *H02M 3/1582* (2013.01); *H02M 2003/1566* (2013.01)

(58) Field of Classification Search
CPC .. H02M 3/1588; H02M 3/156; H02M 3/157; H02M 1/32
USPC ................... 323/271, 282, 283, 351; 363/50
See application file for complete search history.

(56) References Cited

U.S. PATENT DOCUMENTS 7,504,815 B2    3/2009  Moyse et al.
2006/0055388 A1  3/2006  Tang et al.
(Continued)

FOREIGN PATENT DOCUMENTS

CN    101183829 A    5/2008
CN    101521456 A    9/2009
(Continued)

OTHER PUBLICATIONS

Extended European Search Report received for European Patent Application No. 15167984.2, mailed on Nov. 16, 2015, 6 pages.
(Continued)

*Primary Examiner* — Adolf Berhane
(74) *Attorney, Agent, or Firm* — Alpine Technology Law Group LLC

(57) ABSTRACT

Methods and apparatus relating to reducing switching noise and improving transient response in voltage regulators are described. In an embodiment, one or more pulses are inserted into an output waveform of a voltage regulator. The one or more pulses introduce multiple frequencies into the output waveform of the voltage regulator (e.g., to reduce acoustic noise). In another embodiment, the output voltage of a voltage regulator is modified in response to comparison of the output voltage with at least one of a plurality of threshold values. The plurality of threshold values includes an upper trigger point voltage value and a lower trigger point voltage value. Other embodiments are also disclosed and claimed.

23 Claims, 13 Drawing Sheets

(51) Int. Cl.
*H02M 3/00* (2006.01)
*H02M 1/44* (2007.01)
*H02M 3/156* (2006.01)

(56) References Cited

U.S. PATENT DOCUMENTS

| | | | |
|---|---|---|---|
| 2006/0055574 A1* | 3/2006 | Maksimovic | G04F 10/005 341/155 |
| 2006/0061795 A1* | 3/2006 | Walmsley | G06F 21/75 358/1.14 |
| 2006/0152204 A1* | 7/2006 | Maksimovic | H02M 1/38 323/284 |
| 2006/0221646 A1 | 10/2006 | Ye et al. | |
| 2007/0036212 A1* | 2/2007 | Leung | H02M 1/42 375/238 |
| 2008/0084723 A1 | 4/2008 | Balakrishnan et al. | |
| 2008/0158915 A1* | 7/2008 | Williams | H02M 3/07 363/21.06 |
| 2009/0213626 A1 | 8/2009 | Yang et al. | |
| 2010/0001704 A1* | 1/2010 | Williams | H02M 3/158 323/283 |
| 2010/0020573 A1 | 1/2010 | Melanson | |
| 2010/0148741 A1 | 6/2010 | Chen et al. | |
| 2010/0301827 A1* | 12/2010 | Chen | H02M 3/156 323/299 |
| 2013/0038310 A1* | 2/2013 | Menegoli | H02M 3/156 323/288 |
| 2013/0093403 A1* | 4/2013 | Jia | H02M 3/1588 323/272 |
| 2013/0320950 A1 | 12/2013 | Jin et al. | |

FOREIGN PATENT DOCUMENTS

| | | |
|---|---|---|
| CN | 101635512 A | 1/2010 |
| CN | 103457453 A | 12/2013 |
| EP | 2211456 A1 | 7/2010 |

OTHER PUBLICATIONS

Office Action and Search Report received for Taiwanese Patent Application No. 104118344, mailed on Mar. 8, 2016, 11 pages including 1 page of English translation.

* cited by examiner

TECHNIQUES FOR REDUCING SWITCHING NOISE AND IMPROVING TRANSIENT RESPONSE IN VOLTAGE REGULATORS

FIELD

The present disclosure generally relates to the field of electronics. More particularly, some embodiments relate to techniques for reducing switching noise and improving transient response in voltage regulators.

BACKGROUND

Voltage Regulators (VRs) are generally used in power delivery applications in which an input voltage needs to be transformed to an output voltage in a ratio that can be both smaller and larger than unity. However, tonal acoustic noise can be caused by a periodic voltage and/or current variation (e.g., generated by such VRs) that causes mechanical vibration in inductors, capacitors, and the Printed Circuit Board (PCB) on which the inductors and capacitors are located.

Additionally, changes in the electrical load coupled to a VR may cause the output voltage of the VR to droop when input current increases, or its output voltage to increase when input current decreases. Hence, current VRs may provide a poor transient response.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
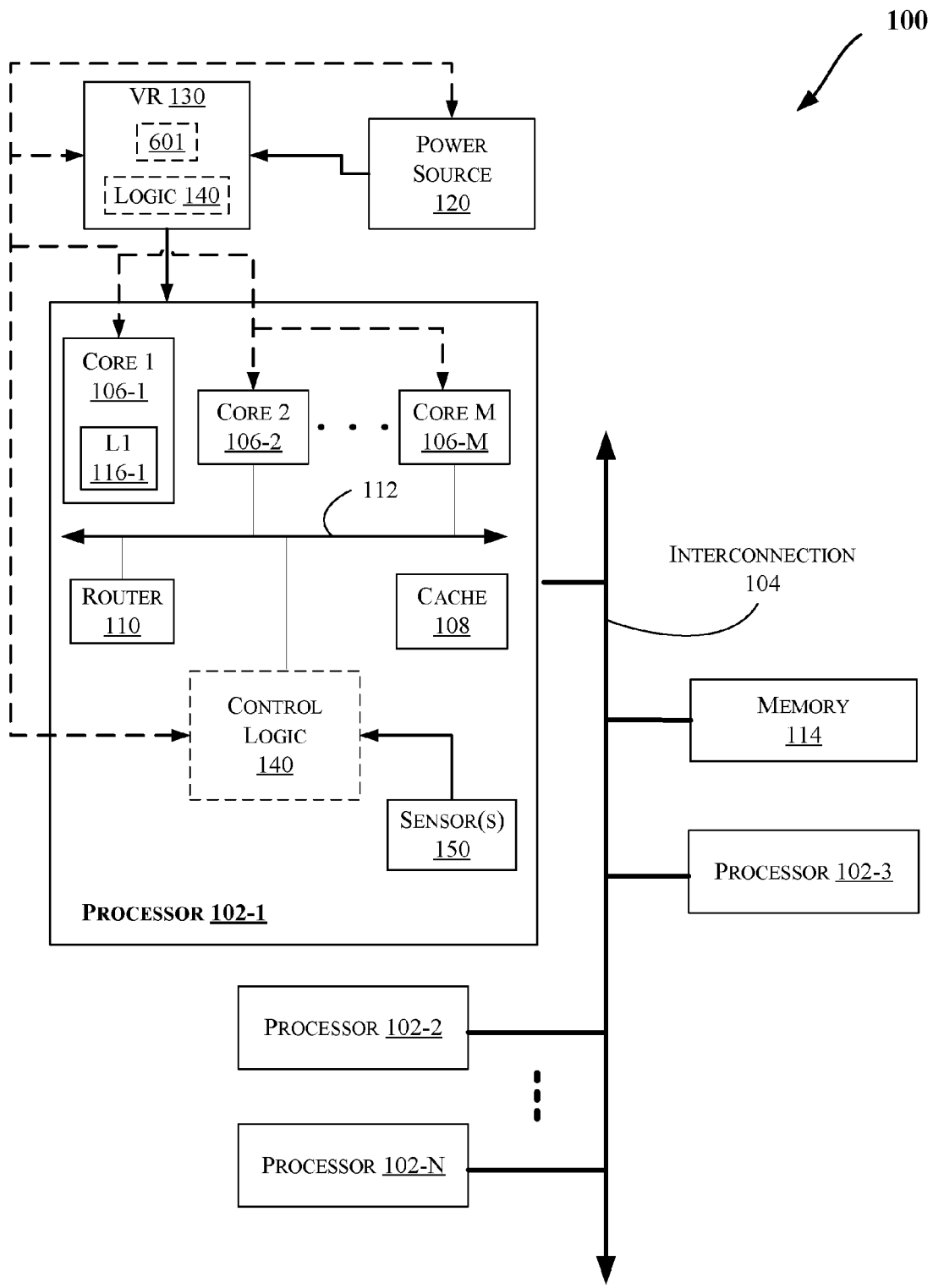
FIGS. 1 and 10-12 illustrate block diagrams of embodiments of computing systems, which may be utilized to implement various embodiments discussed herein.

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, or some combination thereof.

As discussed above, tonal acoustic noise can be caused by a periodic voltage and/or current variation (e.g., generated by a switching VR) that causes mechanical vibration in inductors, capacitors, and the Printed Circuit Board ("PCB" which may be interchangeably referred to herein as "board" for simplicity) on which the inductors and capacitors are located. Moreover, some implementations of low power mode in a switching VR uses hysteretic mode, where the HSFET (High Side FET (Field Effect Transistor)) is turned on when the output voltage is below a threshold limit called the LTP (Lower Trigger Point), and turned off when the output voltage is above another threshold limit called the UTP (Upper trigger point). During the time the HSFET is on, energy is transferred from the source and stored in the inductor and capacitor. After the HSFET is turned off, the voltage slowly goes down as the load receives energy from the inductor and capacitor until the voltage reaches the LTP (when the cycle restarts). The problem with this approach is that the switching frequency depends on the values of the load current, inductor, and capacitor and for some combination of these values, it falls in the human audio range of 20 Hz to 20 kHz.

The voltage and current transitions become periodic in nature, and cause electronic components to vibrate. The vibrations are in turn transferred to the board which can radiate acoustic noise. This is unwanted in consumer or server applications. Generally, today's VR designers discover this problem only after the PCB on which the system is made is fully developed, functional, and packaged. Design modifications at this stage involve selection of different inductors, capacitors and layout that are time consuming at end stages of a design, and can lead to BOM (Bill Of Materials) increases and schedule delays. Furthermore, any component change usually requires a lot of validation, and can lead to shipments being stopped/delayed.

To this end, some embodiments reduce audible acoustic noise that is generated by switching Voltage Regulators (VRs), e.g., without changing inductor(s), capacitor(s), and/or board layout. In an embodiment, randomness is inserted into the voltage and/or current transitions (e.g., without changing the inductor(s), capacitor(s), and/or board layout, all of which would incur some additional costs or schedule delay).

Additionally, VRs are used extensively in electronic systems to convert voltage from one DC (Direct Current) level to another. Changes in the load of such VRs may cause their output voltage to droop when input current increases, or their output voltage to increase when input current decreases. Hence, current VRs may provide a poor transient response.

To address this, some embodiments improve transient response in VRs. Moreover, some current VRs include a power stage, gate drive generation, L/C filter (where "L" refers to inductor and "C" refers to capacitor), and a feedback loop. The feedback loop can be implemented as a digital circuit, e.g., to make it easier to program and/or modify behavior for different loads. Further, some current implementations for digitally controlled voltage regulators may use an ADC (Analog-to-Digital Converter) to measure the output voltage, a linear compensator to compute the duty cycle, and a DPWM (Digital Pulse Width Modulation) block to generate the PWM (Pulse Width Modulation) signal provided to the power stage. An embodiment adds a non-linear block in parallel with the linear block that generates the PWM signal. With this approach, one can obtain a high integral gain and still obtain reasonable transient response.

Furthermore, some embodiments may be applied in computing systems that include one or more processors (e.g., with one or more processor cores), such as those discussed with reference to FIGS. 1-12, including for example mobile computing devices such as a smartphone, tablet, UMPC (Ultra-Mobile Personal Computer), laptop computer, Ultrabook™ computing device, smart watch, smart glasses, wearable devices, etc., and/or larger systems such as computer servers with many cores, etc. More particularly, FIG. 1 illustrates a block diagram of a computing system 100, according to an embodiment. The system 100 may include one or more processors 102-1 through 102-N (generally referred to herein as "processors 102" or "processor 102"). The processors 102 may communicate via an interconnection or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106," or "core 106"), a cache 108, and/or a router 110. The processor cores 106 may be implemented on a single integrated circuit (IC) chip. Moreover, the chip may include one or more shared and/or private caches (such as cache 108), buses or interconnections (such as a bus or interconnection 112), graphics and/or memory controllers (such as those discussed with reference to FIG. 10-12), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that are utilized by one or more components of the processor 102-1, such as the cores 106. For example, the cache 108 may locally cache data stored in a memory 114 for faster access by the components of the processor 102 (e.g., faster access by cores 106). As shown in FIG. 1, the memory 114 may communicate with the processors 102 via the interconnection 104. In an embodiment, the cache 108 (that may be shared) may be a mid-level cache (MLC), a last level cache (LLC), etc. Also, each of the cores 106 may include a level 1 (L1) cache (116-1) (generally referred to herein as "L1 cache 116") or other levels of cache such as a level 2 (L2) cache. Moreover, various components of the processor 102-1 may communicate with the cache 108 directly, through a bus (e.g., the bus 112), and/or a memory controller or hub.

The system 100 may also include a platform power source 120 (e.g., a Direct Current (DC) power source or an Alternating Current (AC) power source) to provide power to one or more components of the system 100. The power source 120 could include a PV (Photo Voltaic) panel, wind generator, thermal generator water/hydro turbine, etc. In some embodiments, the power source 120 may include one or more battery packs (e.g., charged by one or more of a PV panel, wind generator, thermal generator water/hydro turbine, plug-in power supply (for example, coupled to an AC power grid), etc.) and/or plug-in power supplies. The power source 120 may be coupled to components of system 100 through a Voltage Regulator (VR) 130. Moreover, even though FIG. 1 illustrates one power source 120 and a single voltage regulator 130, additional power sources and/or voltage regulators may be utilized. For example, one or more of the processors 102 may have corresponding voltage regulator(s) and/or power source(s). Also, the voltage regulator(s) 130 may be coupled to the processor 102 via a single power plane (e.g., supplying power to all the cores 106) or multiple power planes (e.g., where each power plane may supply power to a different core or group of cores).

Additionally, while FIG. 1 illustrates the power source 120 and the voltage regulator 130 as separate components, the power source 120 and the voltage regulator 130 may be incorporated into other components of system 100. For example, all or portions of the VR 130 may be incorporated into the power source 120 and/or processor 102.

As shown in FIG. 1, the processor 102 may further include a power control logic 140 (which may be implemented as a Power Management Unit (PMU) for example) to control supply of power to components of the processor 102 (e.g., cores 106). In an embodiment, logic 140 is provided on a reprogrammable power management IC (RP-MIC). Such RPMIC implementation may be used in low power devices (such as portable devices discussed herein) through large computer servers such as discussed herein with reference to FIG. 1 or 10-12.

Further, logic 140 may have access to one or more storage devices discussed herein (such as cache 108, L1 cache 116, memory 114, or another memory in system 100) to store information relating to operations of logic 140 such as information communicated with various components of system 100 as discussed here. As shown, the logic 140 may be coupled to the VR 130 and/or other components of system 100 such as the cores 106 and/or the power source 120. Also, logic 140 may be provide elsewhere in system 100, such as within the VR 130.

Additionally, the logic 140 may be coupled to receive information (e.g., in the form of one or more bits or signals) to indicate status of one or more sensors 150. The sensor(s) 150 may be provided proximate to components of system 100 (or other computing systems discussed herein such as those discussed with reference to other figures including 10-12, for example), such as the cores 106, interconnections 104 or 112, components outside of the processor 102, etc., to sense variations in various factors affecting power/thermal behavior of the system/platform, such as temperature, operating frequency, operating voltage, power consumption, and/or inter-core communication activity, etc.

The logic 140 may in turn instruct the VR 130, power source 120, and/or individual components of system 100 (such as the cores 106) to modify their operations. For example, logic 140 may indicate to the VR 130 and/or power source 120 (or PSU (Power Supply Unit)) to adjust their output. For example, logic 140 may cause insertion of randomness into the voltage and/or current transitions by the VR 130. Also, logic 140 may include a non-linear logic block in the VR 130 in parallel with the linear block of the VR 130 for generation of the PWM signal. In some embodiments, logic 140 may request the cores 106 to modify their operating frequency, power consumption, etc. Additionally, even though components 140 and 150 are shown to be included in processor 102-1, these components may be provided elsewhere in the system 100. For example, power control logic 140 may be provided in the VR 130, in the power source 120, directly coupled to the interconnection 104, within one or more (or alternatively all) of the processors 102, outside of computing device/system (e.g., as a standalone device), coupled to (or integrated with) the power source 120, etc.

As discussed above, tonal acoustic noise can be caused by a periodic voltage and/or current variation (e.g., generated by switching VRs) that causes mechanical vibration in inductor(s), capacitor(s), and the Printed Circuit Board ("PCB" which may be interchangeably referred to herein as "board" for simplicity) on which the inductors and capacitors are located. To this end, some embodiments reduce audible acoustic noise that is generated by switching Voltage Regulators (VRs), e.g., without changing inductor(s), capacitor(s), and/or board layout. In an embodiment, randomness is inserted into the voltage and/or current transitions (e.g., without changing the inductor(s), capacitor(s), and/or board layout, all of which would incur some additional costs or schedule delay).

Furthermore, some embodiments are relatively simple to implement, e.g., because they can be done in a system that is already designed without any hardware changes. An embodiment involves injecting a random set of frequencies into the voltage and/or current profile (e.g., in a spread spectrum) to reduce tonal noise.

In various embodiments, there are multiple techniques of doing this as follows (which may be performed by logic 140):

(1) In a hysteretic mode, change LTP (Lower Trigger Point) and UTP (Upper Trigger Point), and inject minimum duty cycle pulses randomly and/or pseudo-randomly to introduce multiple frequencies in the voltage and/or current waveform.

(2) In a PFM (Pulse Frequency Modulation) based control system, change the LTP and the pulse on/active time randomly and/or pseudo-randomly to introduce multiple frequencies in the voltage and/or current waveform.

(3) For a PWM based control system, change the switching period and duty cycle randomly.

Figure 2:
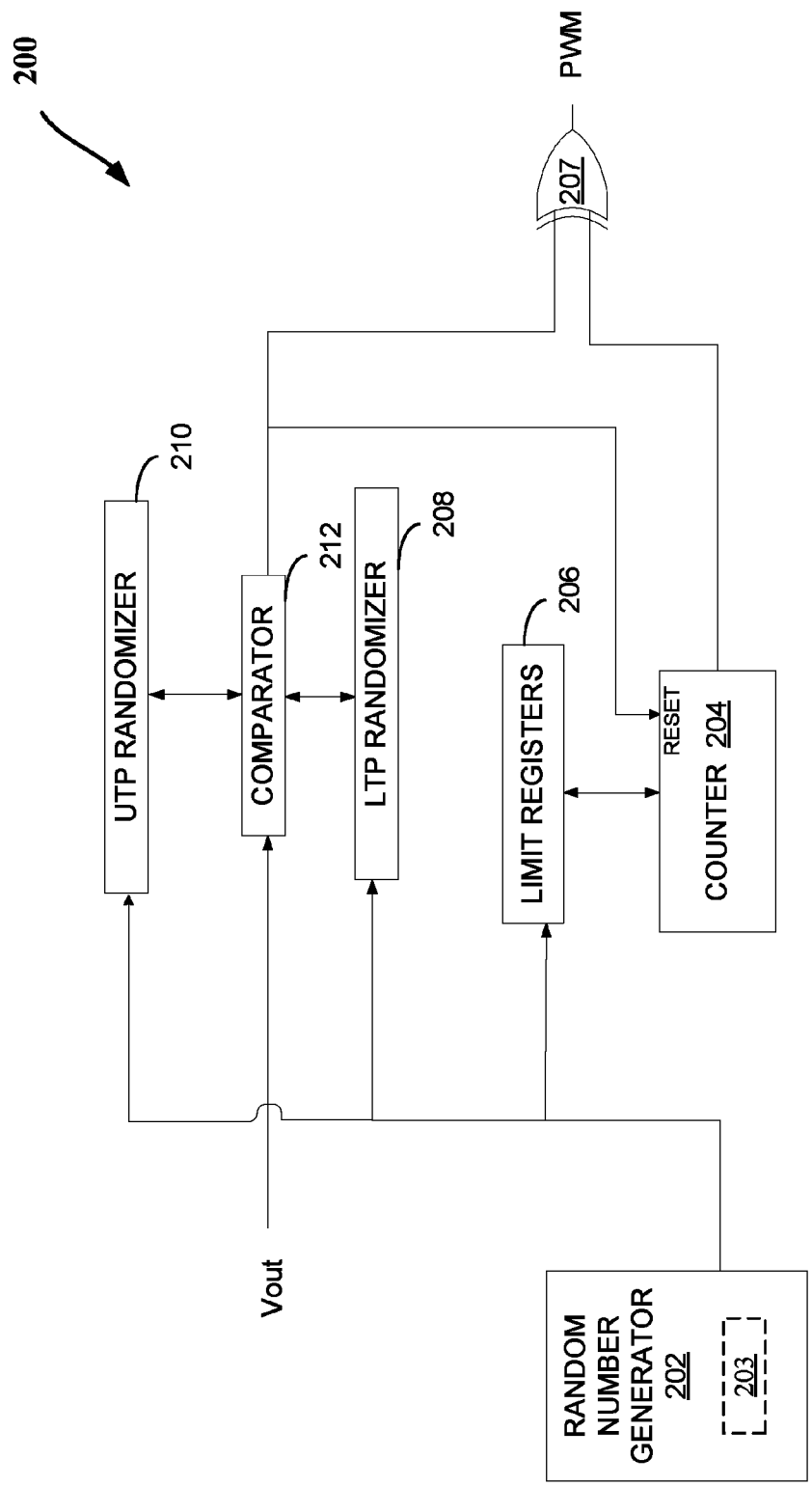
FIG. 2 illustrates a block diagram of noise reduction logic, according to an embodiment.

FIG. 2 illustrates a block diagram of noise reduction logic 200, according to an embodiment. Logic 200 may be implemented in the VR 130 and/or logic 140 of FIG. 1. The implementation described with reference to FIG. 2 modifies a hysteretic control VR by injecting a minimum duration pulse into the VR at a random frequency so that the switching noise is spread across multiple frequencies, instead of being confined to one frequency. This reduces noise amplitude and volume, and any noise present becomes a hiss of white noise as opposed to a single frequency tonal noise. A single high amplitude tone has been demonstrated to be much more disturbing to humans than random white noise. An embodiment randomly or pseudo-randomly varies the time period between successive injection of energy (which occurs when HSFET is turned ON). The re-randomization is achieved by altering the LTP and UTP settings in every period.

Referring to FIG. 2, a random number generator logic 202 generates random bits. In an embodiment, logic 202 uses a 16-bit LFSR (Linear Feedback Shift Register 203) to generate the random bits. Other implementations are also possible, such as using thermal noise or metastable flop to generate a random number. Further, one or more of the following randomization techniques are used in some embodiments: (a) move the LTP upwards (e.g., within a programmable limit) to change switching frequency; (b) move UTP downwards (e.g., within a programmable limit) to change switching frequency; and/or (c) randomize the time the HSFET can stay continuously on or off.

The maximum on/off-time (i.e., duration of the inserted pulses) may be implemented with the help of a counter 204 coupled to two limit registers 206 (e.g., referred to as the upper limit and the lower limit registers). On every clock cycle, the counter 204 increments (or decrements depending on the implementation). If the counter increments above the upper limit, it is reloaded with the lower limit. This means that the counter value is a random number between the upper and lower limit values stored in the registers 206. The HSFET is monitored with a timer that is reset every time the HSFET turns on or off. In case the HSFET has not switched for a period longer than the counter value (a random number), a minimum duty cycle pulse is injected into the PWM signal with the help of an XOR gate 207 such as shown in FIG. 2.

By adjusting the LTP and UTP threshold variability, as well as the limit registers 206, what random frequencies the logic generates can be controlled, as well as the ripple generated. In some embodiments, the following parameters can be randomized: (1) LTP (e.g., by logic 208 based on input from logic 202); (2) UTP (e.g., by logic 210 based on input from logic 202); (3) the period at which a pulse is injected; and/or (4) the time period the injected pulse is on (or active). As illustrated in FIG. 2, a comparator logic 212 may compare the values from logic 208/210, as well as output voltage (Vout) to cause a reset of counter 204 (as discussed above) and the output of the XOR gate 207.

Figure 3:
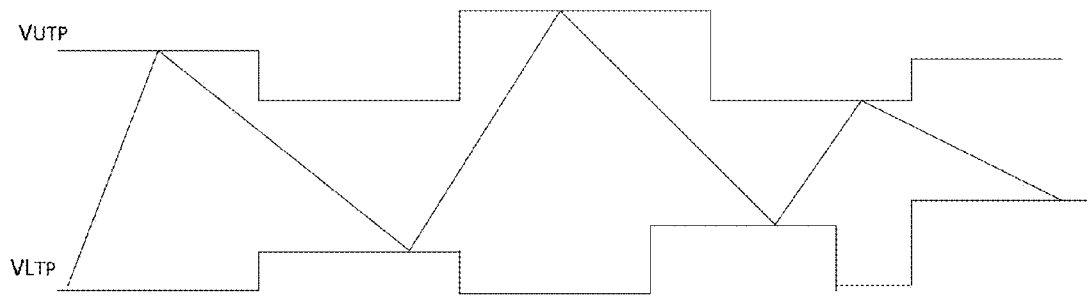
FIGS. 3, 4A, 4B, 5, 7, 8A, 8B, 9A, and 9B illustrate sample wave forms, according to some embodiments.
Figure 5:
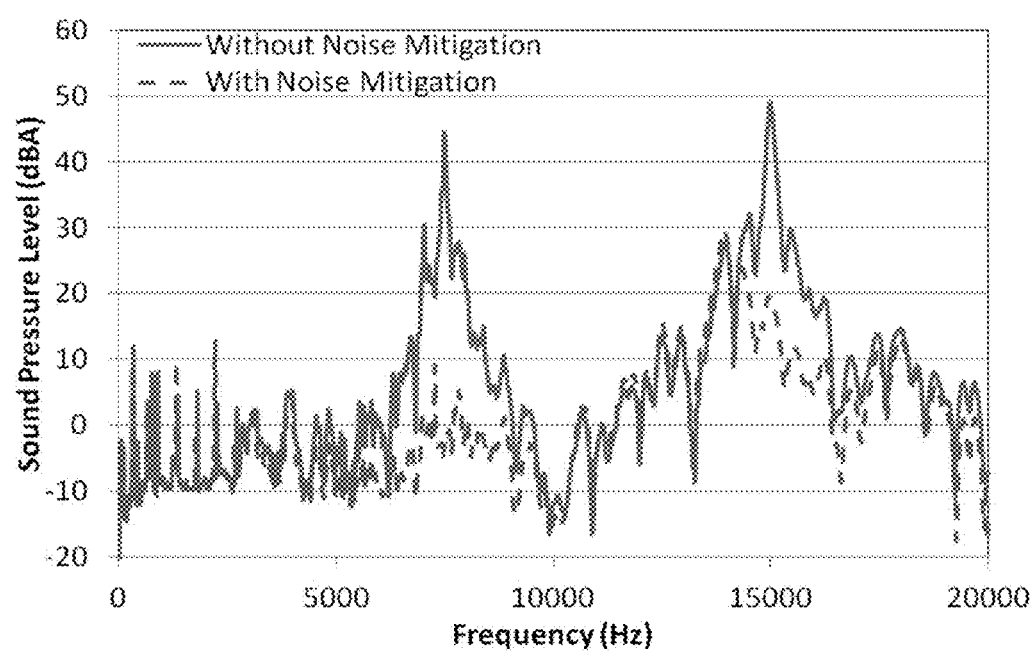
Figure 4A:
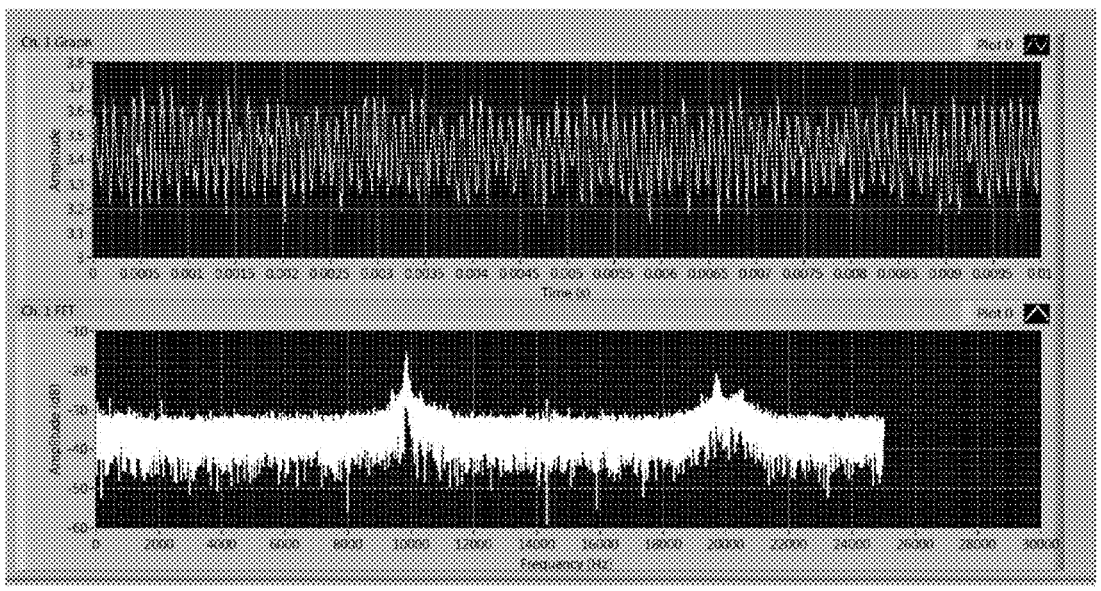
Figure 4B:
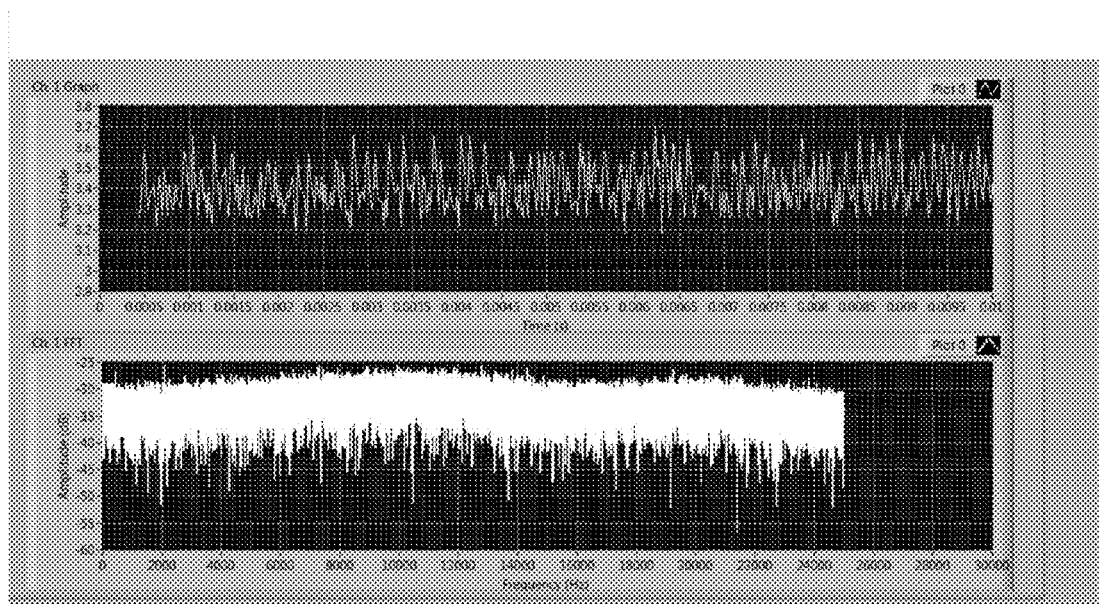

FIG. 3 shows a sample wave form representing LTP and UTP voltage randomization, according to an embodiment. FIGS. 4A and 4B illustrate resulting Fourier spectrum wave forms for amplitude of an output voltage without randomization and with randomization. Referring to FIG. 4A, peaks in the FFT (Fast Fourier Transform) format indicate likely acoustic noise tonal issues. In contrast, FIG. 4B indicates that the average noise power is lower, e.g., spreading out the peaks across the frequency range. FIG. 5 shows waveforms of sample readings for sound versus frequency, e.g., as measured with a microphone in a soundproof chamber. As can be seen, application of techniques discussed with reference to FIGS. 1-4B result in a reduction of amplitude and tonality of the noise.

Accordingly, some embodiments reduce switching noise significantly, as can be seen by comparing FIGS. 4A and 4B. In FIGS. 4A and 4B, the readings are taken for setpoint=3.3V, load current=1.6 A, inductor=3.6 µH, C=350 µF. Further, some embodiments (such as discussed with reference to FIGS. 1-5) provide low cost and are relatively easier to implement. For example, the only additional hardware needed are counters and a LFSR (such as discussed with reference to FIG. 2), which are quite simple to design and provide, and utilize relatively lower area compared to the entire voltage regulator.

Furthermore, in an embodiment, randomization parameters are changed in software as they can be implemented as programmable registers 206. This methodology has the potential to reduce the annoyance level experienced by the end-users, e.g., from very annoying to not annoying. This allows for trade-offs to mitigate noise and/or increase power consumption savings very late in the design cycle, or even by firmware updates.

Moreover, switching VRs cause a periodic waveform at the load power supply, as well as have a period ripple at the output. This can interfere with some types of loads. EMI (Electro Magnetic Interference) from the inductor and/or PCB traces can also occur and affect other circuits. This problem is worse if the switching frequency or its harmonics are in the appropriate RF (Radio Frequency) range. Accordingly, some embodiments (such as those discussed with reference to FIGS. 1-5) can vary the switching frequency to reduce tonal RF noise and/or EMI.

As previously discussed, VRs are used extensively in electronic systems to convert voltage from one DC (Direct Current) level to another. Changes in the load of such VRs may cause their output voltage to droop when input current increases, or their output voltage to increase when input current decreases. Hence, current VRs may provide a poor transient response. To address this, some embodiments improve transient response in VRs.

Figure 6:
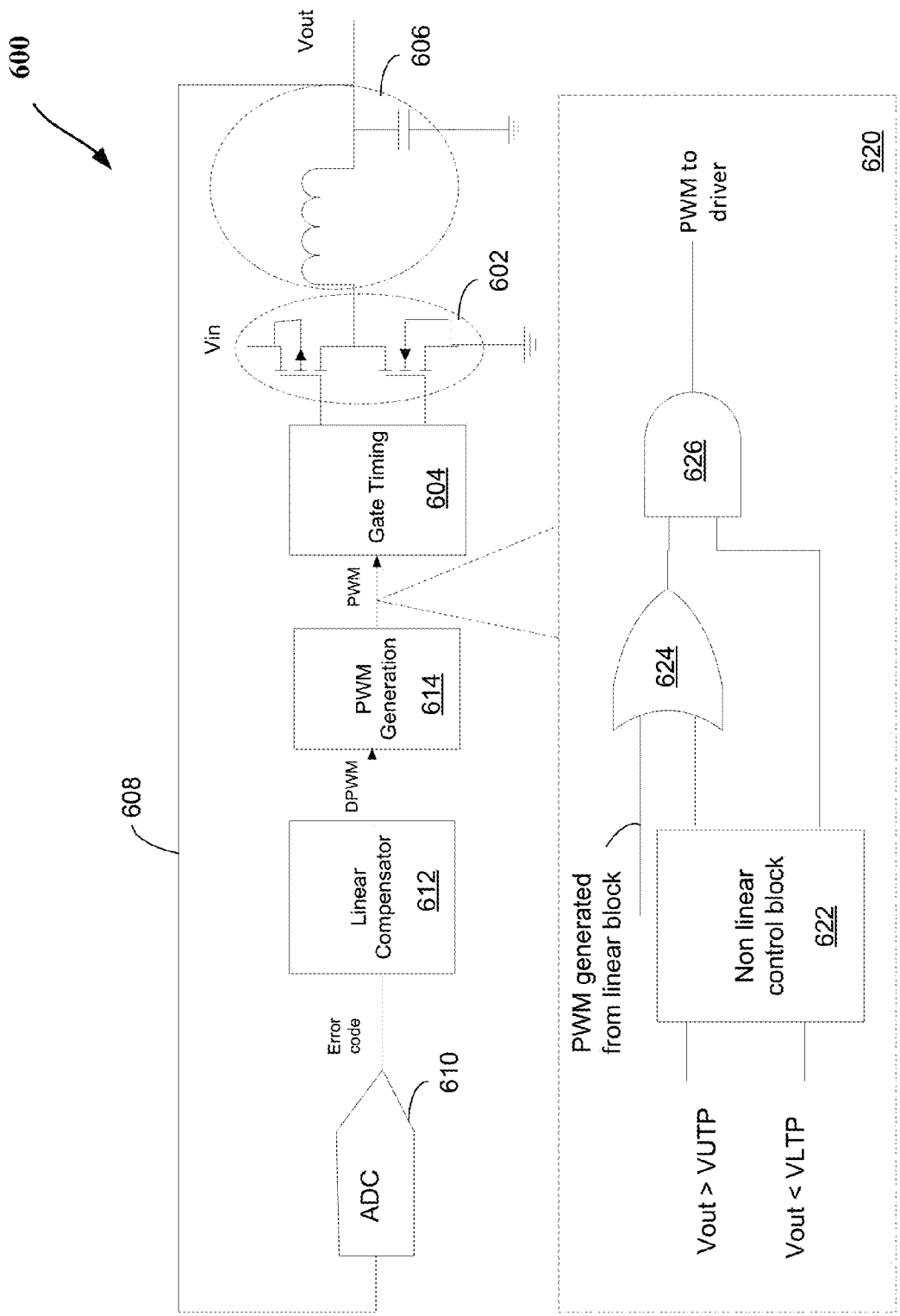
FIG. 6 illustrates a block diagram of voltage regulator, according to an embodiment.
Figure 7:
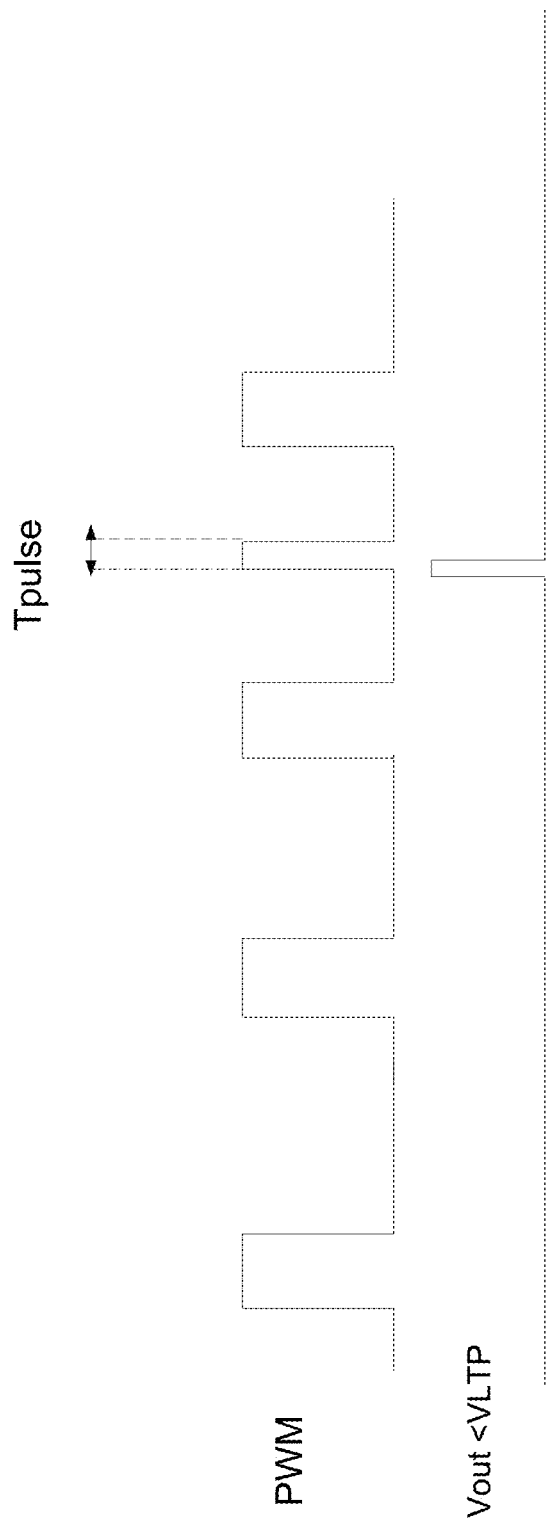

FIG. 6 illustrates a block diagram of a voltage regulator 600, according to an embodiment. VRs may include a power stage 602, gate drive generation/timing logic 604, L/C filter 606 (where "L" refers to inductor and "C" refers to capacitor), and a feedback loop 608. The feedback loop can be implemented as a digital circuit (e.g., to make it easier to program and/or modify for different loads).

Further, a digitally controlled voltage regulator (such as VR 600) may use an ADC (Analog-to-Digital Converter) 610 to measure the output voltage (Vout), linear compensator logic 612 to compute the duty cycle, and DPWM (Digital Pulse Width Modulation) logic 614 to generate the PWM (Pulse Width Modulation) signal transmitted to the power stage. An embodiment adds non-linear logic block 620 in parallel with the linear block that generates the PWM signal. As shown in FIG. 6, the logic 620 includes a non-linear control logic to receive input regarding UTP and LTP voltage comparisons to Vout and generates an output signal that is fed to an OR gate 624 with the PWM signal generated by the logic 614. The output of the OR gate 624 is fed to an AND gate 626. With this approach, one can have a high integral gain and still obtain reasonable transient response.

Hence, a digital control buck VR configuration is shown in FIG. 6. Moreover, one purpose of the linear compensator logic 612 is to generate a digital PWM command (DPWM) that is fed to the PWM generation logic block 614 which generates the PWM signal required to keep the output voltage at the set-point. Changes in the load can cause the output voltage to droop when current increases, or increase when current decreases. As discussed herein, a "buck" VR is generally used in power delivery applications in which an input voltage needs to be transformed to an output voltage in a ratio that is smaller than unity, whereas a "boost" VR is generally used in power delivery application in which an input voltage needs to be transformed to an output voltage in a ratio that is larger than unity. By extension, a "buck-boost" VR generally refers to the combination of the two types of VR, i.e., used in power delivery application in which an input voltage needs to be transformed to an output voltage in a ratio that is both smaller and larger than unity.

For example, a processor or SOC (System On Chip) load has large transient current changes as it moves between different power states, and even within a power state based on what operation it is performing. It also requires a tight regulation requiring the output voltage to be about +/−3% of the set-point. Some implementations may make the linear compensator a PID (Proportional/Integral/Differential) compensator, which has a poor transient response due to the integral term. In some implementations the following solutions are possible to keep output voltage constant: (a) a large decoupling capacitor that adds to BOM and board area (large electrolytic capacitors are also unreliable); or (b) reducing the integral term and increasing the differential term of the compensator that increases ripple (i.e., compensator does not settle at a constant value in steady state). One solution is to reduce the integral gain and increase the differential gain, but this causes a problem for the controller to settle at a fixed PWM. Hence, the output voltage has a ripple on it.

An embodiment adds a non-linear block (e.g., logic 620) in parallel with the linear block that generates the PWM signal. With this approach, one can have a high integral gain, but still obtain good transient response. VR 600 has two threshold voltages (fed to the non-linear control logic 622) that can be programmed based on the set-point: (1) VLTP—the Lower trigger point voltage that should be set equal to the lower limit of the regulation tolerance; and (2) VUTP—the Upper trigger point voltage that should be set equal to the upper limit of regulation tolerance.

Referring to FIG. 6, during normal operation, the output voltage will be at the set-point and the linear controller logic 612 will determine the PWM signal. However, if there is an input voltage or load current transient that causes the output voltage to go to the LTP level, the non-linear mode turns on (e.g., via logic 620) and the PWM to the driver becomes logic 1 or active as long as this condition is true. This causes the output voltage to increase and come back into the regulation window. During this time, the linear compensator logic 612 detects the output voltage drooping and increases the duty cycle. Once the output voltage is back in the regulation window, the linear compensator logic 612 again controls the PWM. If the linear compensator logic 612 has not yet computed the new DPWM to be a sufficiently high duty cycle to keep the output voltage in the regulation window, the non-linear mode is triggered again (e.g., via logic 620). This clamps the output voltage to above the lower trigger point.

An embodiment (shown in FIG. 7) inserts a pulse of programmable width (Tpulse) when the output voltage (Vout) is below the LTP (e.g., as indicted by an input to the non-linear control logic block 622), in addition to the regular PWM pulses. This brings the output voltage back into regulation if there is a short undershoot in the output voltage. If the output voltage rises above the upper trigger point (e.g., as indicted by an input to the non-linear control logic block 622), the non-linear mode is triggered and the PWM is set to logic 0 or inactive. This causes the output voltage to fall and come back below the upper trigger point. In this way, the output voltage cannot rise above the upper trigger point. Similar to adding pulses, some embodiments can also remove pulses if needed.

As the PWM changes almost instantaneously (the only delay is the ADC sampling time), the transient response is improved significantly compared to a linear scheme. The embodiment of FIG. 6 uses two comparators (not shown) to compare the output voltage to the UTP and LTP (input to logic 622), and logic gates to cause the PWM signal to turn on and off based on the comparator outputs. The non-linear control logic block 622 may also include a timer to implement a programmable width pulse.

The embodiments discussed with reference to FIGS. 6-9B reduce the droop significantly for a given current transient and filter capacitance. This means that a lower decoupling capacitance value is needed, reducing BOM costs. To account for line transients, some linear controllers have a feed forward control which involves measuring the input voltage using a separate ADC/comparator. The transient mode logic discussed with reference to FIG. 6 removes the need for this block, simplifying the system. Also, the transient mode logic requires minimal overhead to implement—it uses and ADC that already exists. The only additional logic is the timer and the comparators that are purely digital. Hence, no analog components are needed. Additionally, VR 600 provides a programmable pulse width that can be varied even after the system is designed. In case the VR does not meet the droop/overshoot specification, the pulse width can be modified in firmware, saving the time and cost of a redesign.

Furthermore, some drivers have a maximum on time/off time for a boost capacitor to recharge. If such a driver is used, a mechanism to insert a minimum size pulse into the PWM signal during transient mode can be implemented using a timer. Without this feature the PWM would be 0 or 1 for a long period when the output voltage is out of regulation and then the driver boost capacitors will get discharged. Also, while the implementation described uses a buck VR, the idea can be extended to a Cuk, boost, buck-boost and other topologies (601).

Figure 8A:
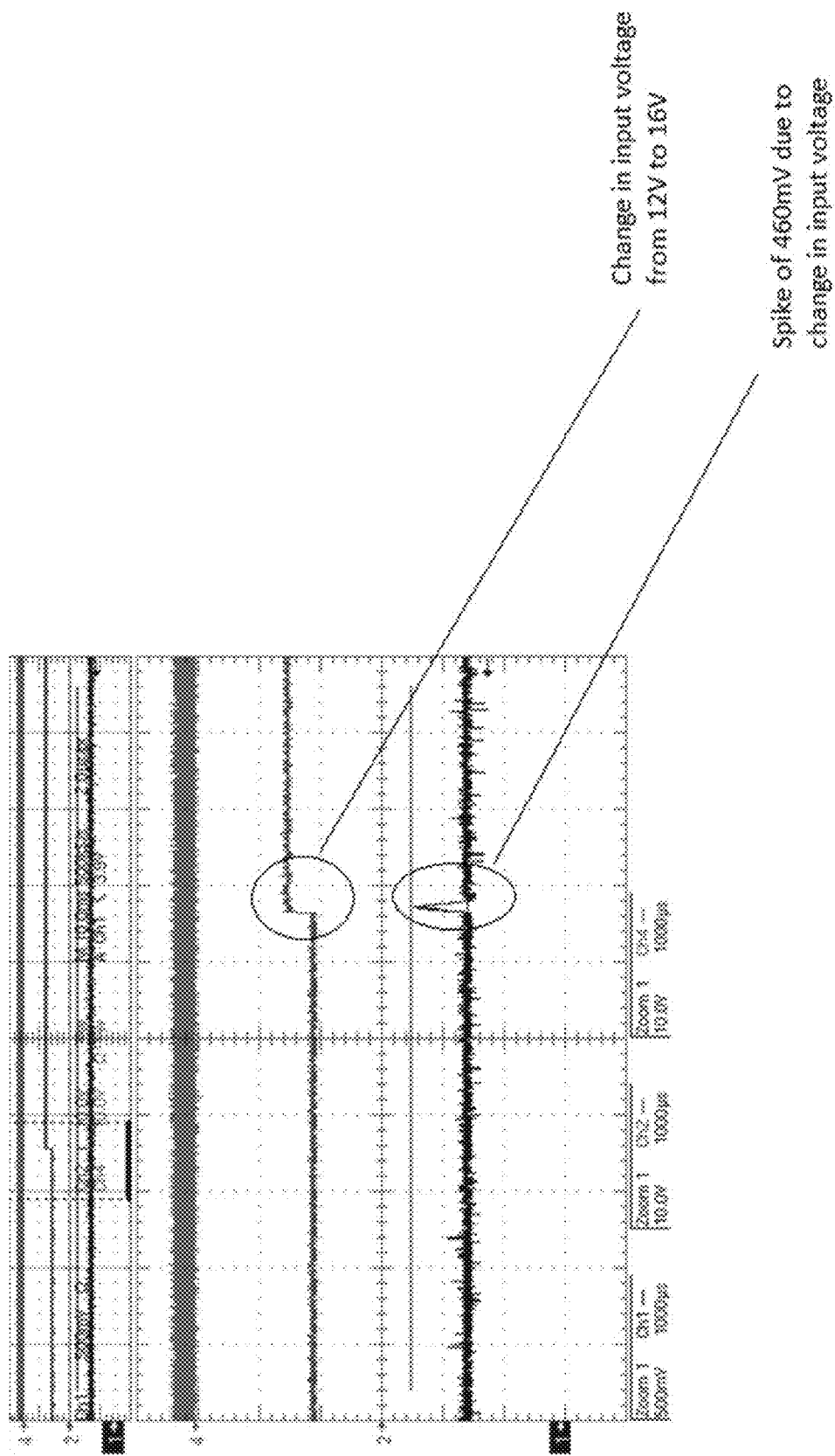
Figure 8B:
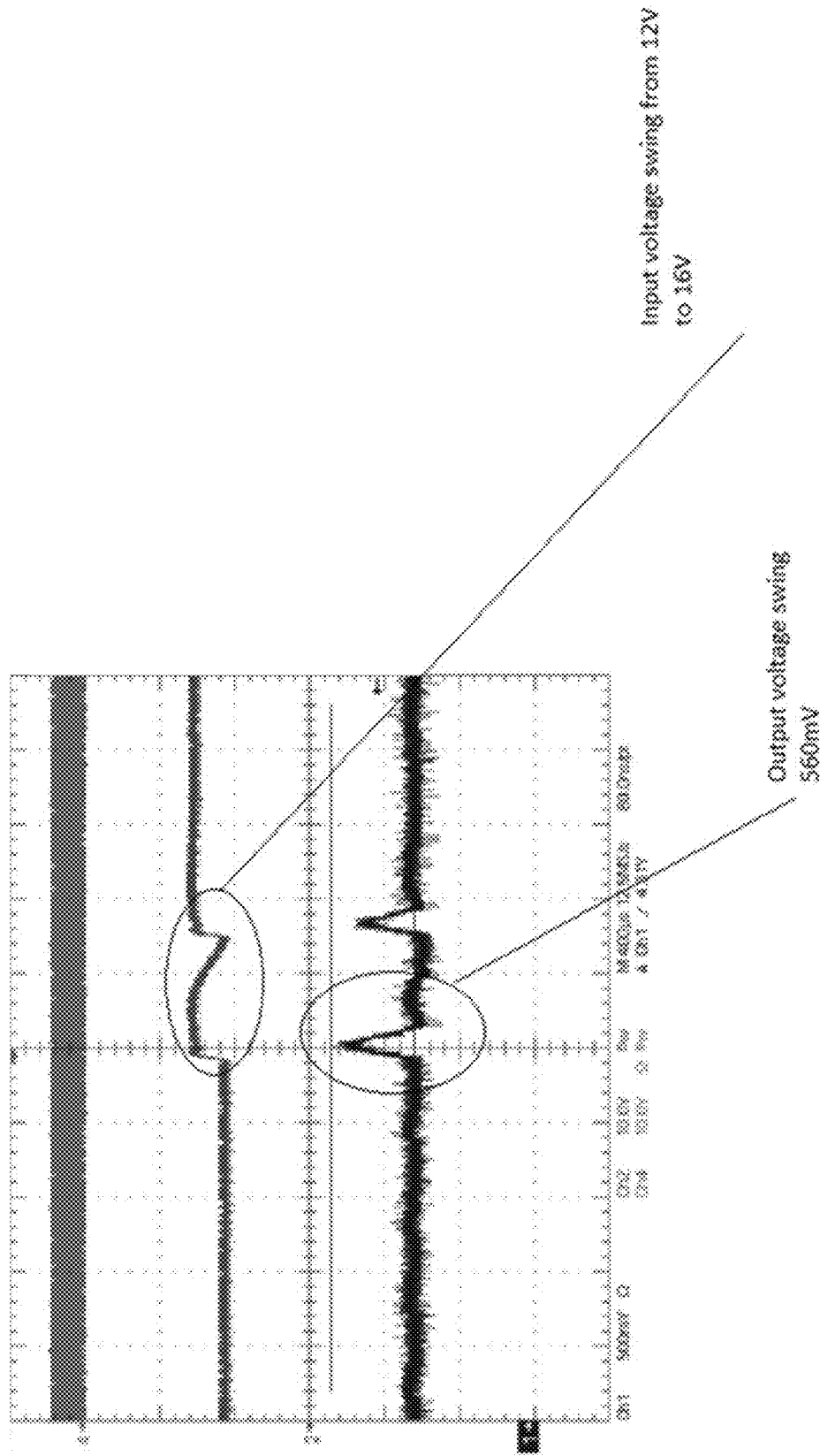
Figure 9A:
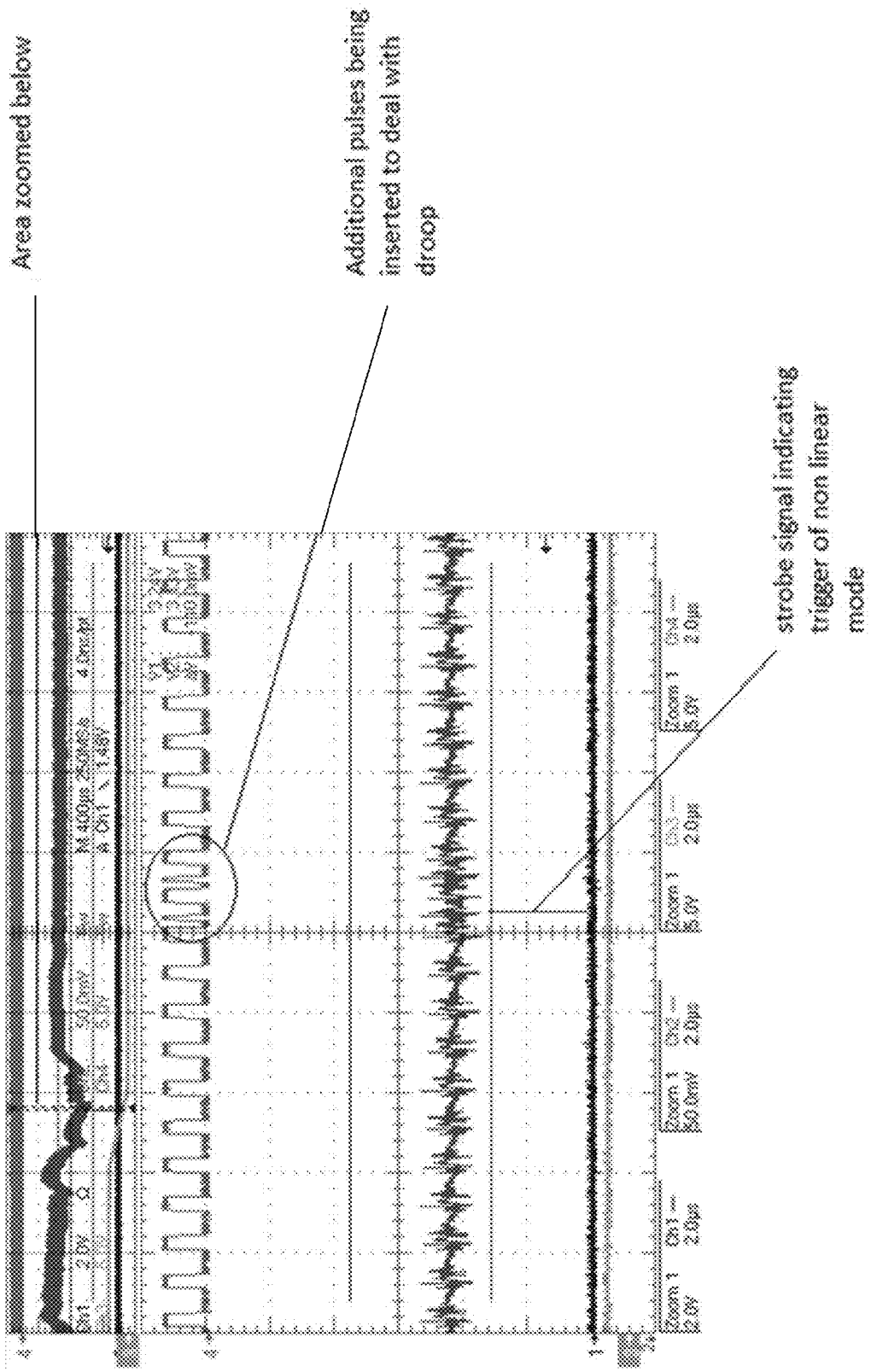
Figure 9B:
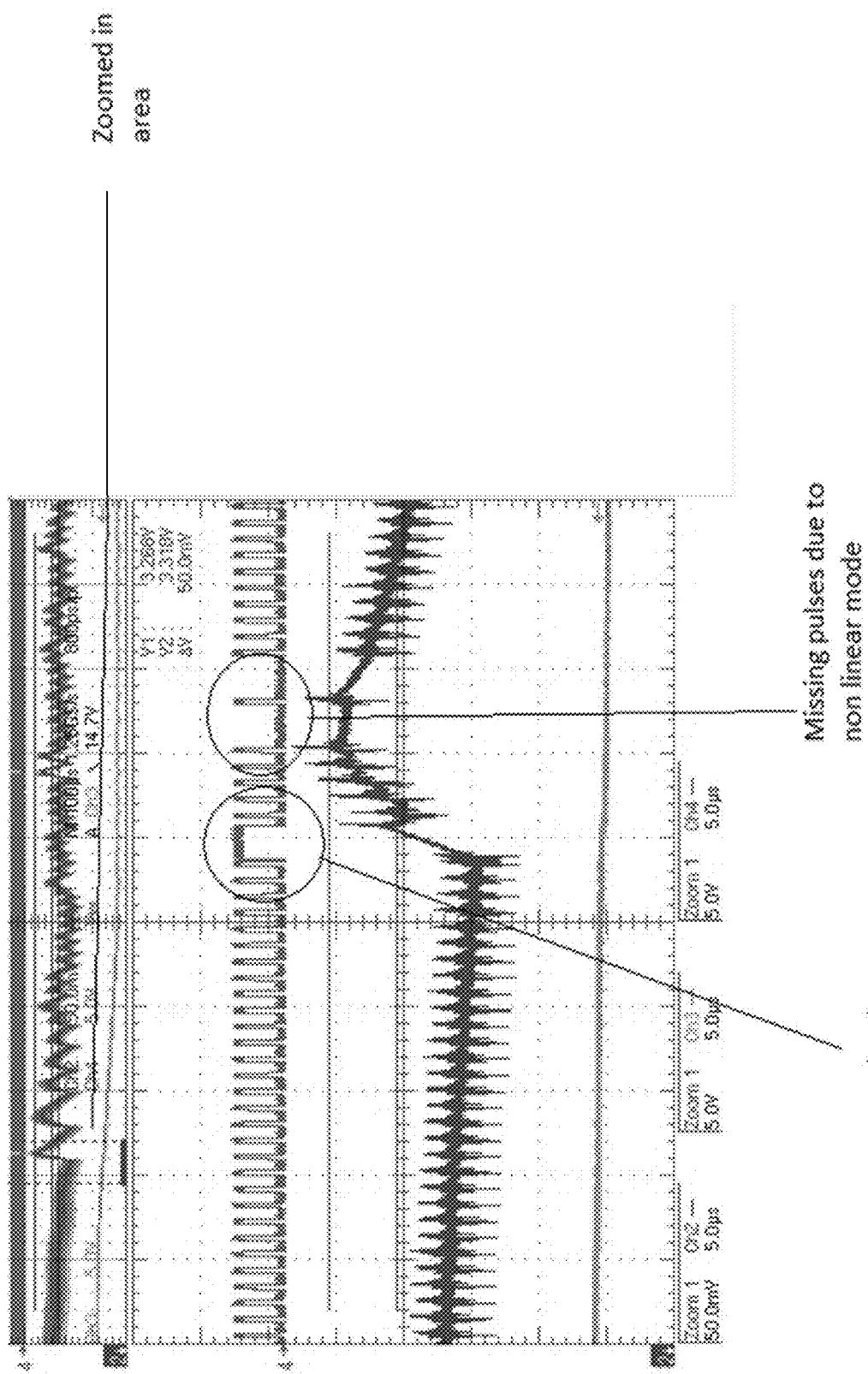

In an embodiment, using a 5.0V VR with L=3.3 µH and C=484 µF, gives the results as shown in FIG. 8A. As shown, the input voltage swings from 12V to 16V and the output voltage changes by 460 mV. As a control, the same system may be tested with hysteretic mode disabled. The latter approach achieves a swing of 560 mV as shown in FIG. 8B. The insertion of additional pulses is shown in FIG. 9A, missing and additional pulses in FIG. 9B.

Figure 10:
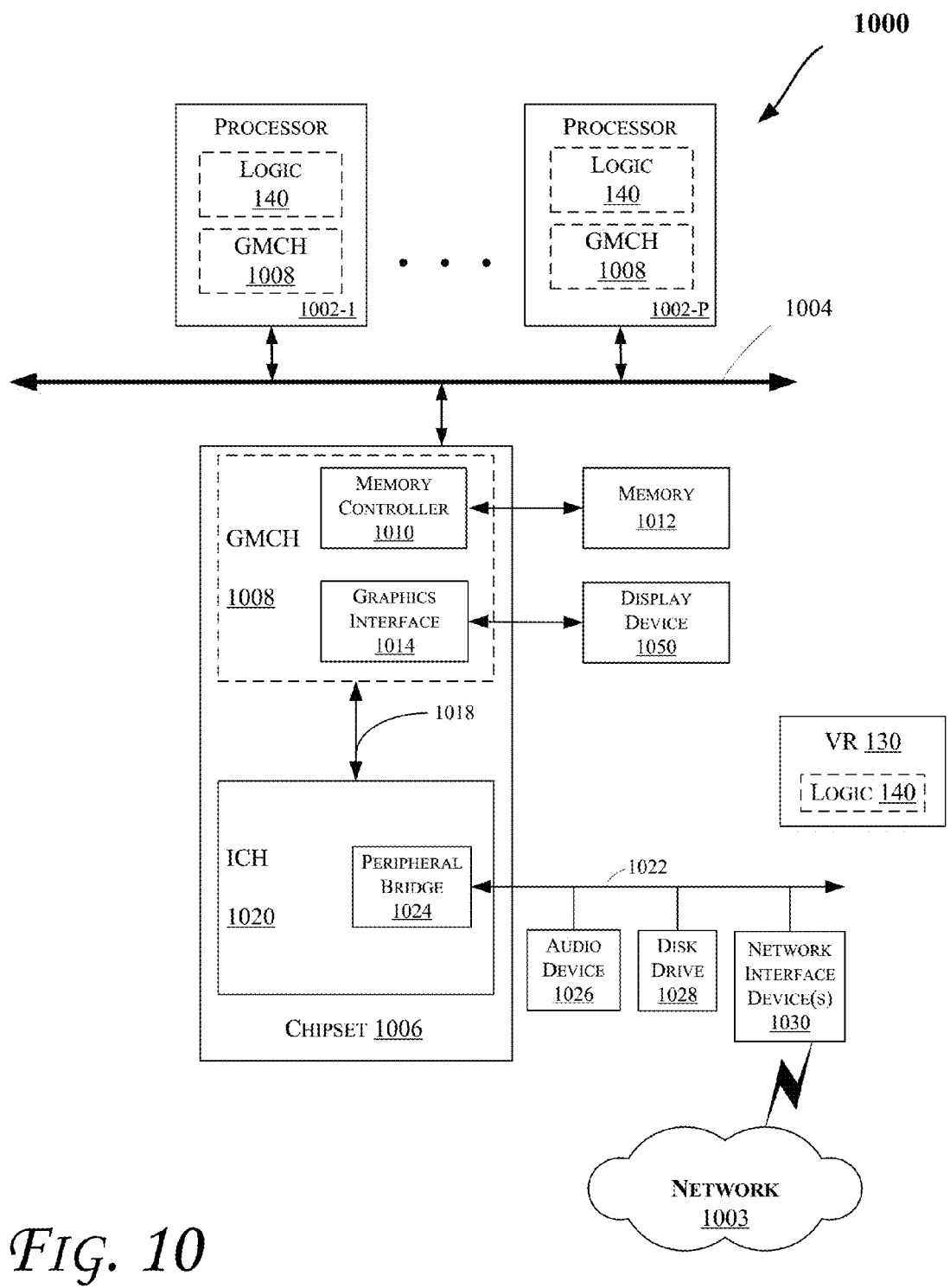

FIG. 10 illustrates a block diagram of a computing system 1000 in accordance with an embodiment. The computing system 1000 may include one or more central processing unit(s) (CPUs) or processors 1002-1 through 1002-P (which may be referred to herein as "processors 1002" or "processor 1002"). The processors 1002 may communicate via an interconnection network (or bus) 1004. The processors 1002 may include a general purpose processor, a network processor (that processes data communicated over a computer network 1003), or other types of a processor (including a reduced instruction set computer (RISC) processor or a complex instruction set computer (CISC)). Moreover, the processors 1002 may have a single or multiple core design. The processors 1002 with a multiple core design may integrate different types of processor cores on the same integrated circuit (IC) die. Also, the processors 1002 with a multiple core design may be implemented as symmetrical or asymmetrical multiprocessors. In an embodiment, one or more of the processors 1002 may be the same or similar to the processors 102 of FIG. 1. In some embodiments, one or more of the processors 1002 may include one or more of the cores 106, logic 140, and sensor(s) 150, of FIG. 1. Also, the operations discussed with reference to FIGS. 1-9B may be performed by one or more components of the system 1000. For example, a voltage regulator (such as VR 130 of FIG. 1) may regulate voltage supplied to one or more components of FIG. 10 at the direction of logic 140.

A chipset 1006 may also communicate with the interconnection network 1004. The chipset 1006 may include a graphics and memory control hub (GMCH) 1008. The GMCH 1008 may include a memory controller 1010 that communicates with a memory 1012. The memory 1012 may store data, including sequences of instructions that are executed by the processor 1002, or any other device included in the computing system 1000. In one embodiment, the memory 1012 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 1004, such as multiple CPUs and/or multiple system memories.

The GMCH 1008 may also include a graphics interface 1014 that communicates with a display device 1050, e.g., a graphics accelerator. In one embodiment, the graphics interface 1014 may communicate with the display device 1050 via an accelerated graphics port (AGP) or Peripheral Component Interconnect (PCI) (or PCI express (PCIe) interface). In an embodiment, the display device 1050 (such as a flat panel display (such as an LCD (Liquid Crystal Display), a cathode ray tube (CRT), a projection screen, etc.) may communicate with the graphics interface 1014 through, for example, a signal converter that translates a digital representation of an image stored in a storage device such as video memory or system memory into display signals that are interpreted and displayed by the display. The display signals produced may pass through various control devices before being interpreted by and subsequently displayed on the display device 1050.

A hub interface 1018 may allow the GMCH 1008 and an input/output control hub (ICH) 1020 to communicate. The ICH 1020 may provide an interface to I/O devices that communicate with the computing system 1000. The ICH 1020 may communicate with a bus 1022 through a peripheral bridge (or controller) 1024, such as a peripheral component interconnect (PCI) bridge, a universal serial bus (USB) controller, or other types of peripheral bridges or controllers. The bridge 1024 may provide a data path between the processor 1002 and peripheral devices. Other types of topologies may be utilized. Also, multiple buses may communicate with the ICH 1020, e.g., through multiple bridges or controllers. Moreover, other peripherals in communication with the ICH 1020 may include, in various embodiments, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 1022 may communicate with an audio device 1026, one or more disk drive(s) 1028, and one or more network interface device(s) 1030 (which is in communication with the computer network 1003). Other devices may communicate via the bus 1022. Also, various components (such as the network interface device 1030) may communicate with the GMCH 1008 in some embodiments. In addition, the processor 1002 and the GMCH 1008 may be combined to form a single chip. Furthermore, the graphics accelerator may be included within the GMCH 1008 in other embodiments.

Furthermore, the computing system 1000 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 1028), a floppy disk, a compact disk ROM (CD-ROM), a digital versatile disk (DVD), flash memory, a magneto-optical disk, or other types of nonvolatile machine-readable media that are capable of storing electronic data (e.g., including instructions). In an embodiment, components of the system 1000 may be arranged in a point-to-point (PtP) configuration. For example, processors, memory, and/or input/output devices may be interconnected by a number of point-to-point interfaces.

Figure 11:
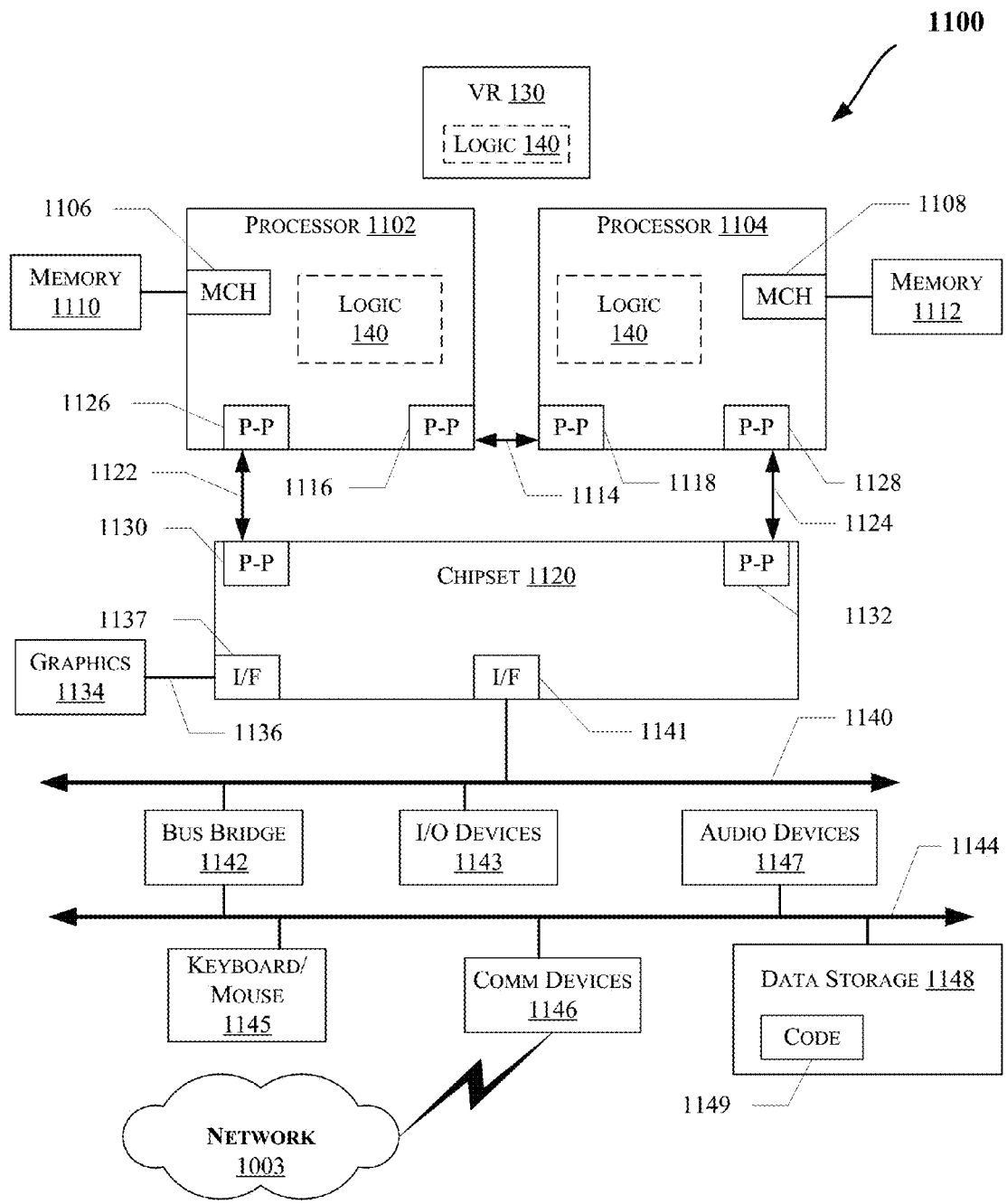

FIG. 11 illustrates a computing system 1100 that is arranged in a point-to-point (PtP) configuration, according to an embodiment. In particular, FIG. 11 shows a system where processors, memory, and input/output devices are interconnected by a number of point-to-point interfaces. The operations discussed with reference to FIGS. 1-10 may be performed by one or more components of the system 1100. For example, a voltage regulator (such as VR 130 of FIG. 1) may regulate voltage supplied to one or more components of FIG. 11.

As illustrated in FIG. 11, the system 1100 may include several processors, of which only two, processors 1102 and 1104 are shown for clarity. The processors 1102 and 1104 may each include a local memory controller hub (MCH) 1106 and 1108 to enable communication with memories 1110 and 1112. The memories 1110 and/or 1112 may store various data such as those discussed with reference to the memory 1012 of FIG. 10. Also, the processors 1102 and 1104 may include one or more of the cores 106, logic 140, and/or sensor(s) 150 of FIG. 1.

In an embodiment, the processors 1102 and 1104 may be one of the processors 1002 discussed with reference to FIG. 10. The processors 1102 and 1104 may exchange data via a point-to-point (PtP) interface 1114 using PtP interface circuits 1116 and 1118, respectively. Also, the processors 1102 and 1104 may each exchange data with a chipset 1120 via individual PtP interfaces 1122 and 1124 using point-to-point interface circuits 1126, 1128, 1130, and 1132. The chipset 1120 may further exchange data with a high-performance graphics circuit 1134 via a high-performance graphics interface 1136, e.g., using a PtP interface circuit 1137.

In at least one embodiment, one or more operations discussed with reference to FIGS. 1-10 may be performed by the processors 1102 or 1104 and/or other components of the system 1100 such as those communicating via a bus 1140. Other embodiments, however, may exist in other circuits, logic units, or devices within the system 1100 of FIG. 11. Furthermore, some embodiments may be distributed throughout several circuits, logic units, or devices illustrated in FIG. 11.

Chipset 1120 may communicate with the bus 1140 using a PtP interface circuit 1141. The bus 1140 may have one or more devices that communicate with it, such as a bus bridge 1142 and I/O devices 1143. Via a bus 1144, the bus bridge 1142 may communicate with other devices such as a keyboard/mouse 1145, communication devices 1146 (such as modems, network interface devices, or other communication devices that may communicate with the computer network 1003), audio I/O device, and/or a data storage device 1148. The data storage device 1148 may store code 1149 that may be executed by the processors 1102 and/or 1104.

Figure 12:
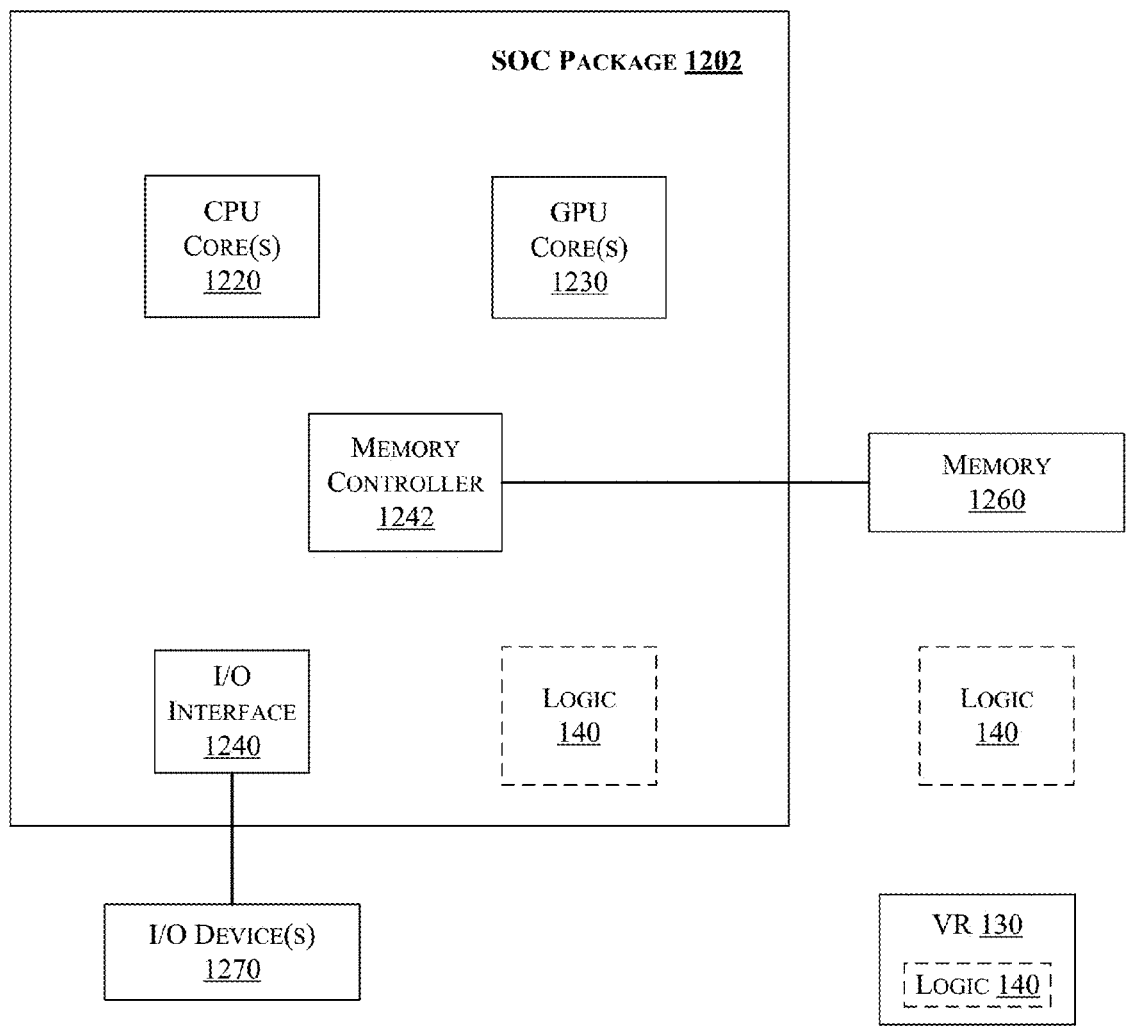

In some embodiments, one or more of the components discussed herein can be embodied as a System On Chip (SOC) device. FIG. 12 illustrates a block diagram of an SOC package in accordance with an embodiment. As illustrated in FIG. 12, SOC 1202 includes one or more Central Processing Unit (CPU) cores 1220, one or more Graphics Processor Unit (GPU) cores 1230, an Input/Output (I/O) interface 1240, and a memory controller 1242. Various components of the SOC package 1202 may be coupled to an interconnect or bus such as discussed herein with reference to the other figures. Also, the SOC package 1202 may include more or less components, such as those discussed herein with reference to the other figures. Further, each component of the SOC package 1220 may include one or more other components, e.g., as discussed with reference to the other figures herein. In one embodiment, SOC package 1202 (and its components) is provided on one or more Integrated Circuit (IC) die, e.g., which are packaged into a single semiconductor device.

As illustrated in FIG. 12, SOC package 1202 is coupled to a memory 1260 (which may be similar to or the same as memory discussed herein with reference to the other figures) via the memory controller 1242. In an embodiment, the memory 1260 (or a portion of it) can be integrated on the SOC package 1202.

The I/O interface 1240 may be coupled to one or more I/O devices 1270, e.g., via an interconnect and/or bus such as discussed herein with reference to other figures. I/O device(s) 1270 may include one or more of a keyboard, a mouse, a touchpad, a display, an image/video capture device (such as a camera or camcorder/video recorder), a touch screen, a speaker, or the like. Furthermore, SOC package 1202 may include/integrate the logic 140 in an embodiment. Alternatively, the logic 140 may be provided outside of the SOC package 1202 (i.e., as a discrete logic).

The following examples pertain to further embodiments. Example 1 includes an apparatus comprising: logic, at least a portion of which is in hardware, to insert one or more pulses into an output waveform of a voltage regulator, wherein the one or more pulses are to introduce multiple frequencies into the output waveform of the voltage regulator. Example 2 includes the apparatus of example 1, wherein the logic is to randomly or pseudo-randomly vary a time period between successive insertion of the one or more pulses. Example 3 includes the apparatus of example 1, comprising logic to generate random bits, wherein the logic to insert the one or more pulses is to randomly or pseudo-randomly vary a time period between successive insertion of the one or more pulses based on the random bits. Example 4 includes the apparatus of example 3, wherein the logic to generate the random bits is to comprise a linear feedback shift register. Example 5 includes the apparatus of example 1, further comprising a first register to store a lower trigger point value and a second register to store an upper trigger point value, wherein the logic is to vary the duration of the one or more pulses based on values stored in the first register and the second register. Example 6 includes the apparatus of example 1, further comprising a first register to store a lower trigger point value and a second register to store an upper trigger point value, wherein the upper and lower trigger point values are to be changed randomly within limits to reduce noise. Example 7 includes the apparatus of example 1, wherein the one or more pulses are minimum duration pulses. Example 8 includes the apparatus of example 1, wherein the logic is to insert the one or more pulses in a spread spectrum. Example 9 includes the apparatus of example 1, wherein the voltage regulator is to comprise one of: a buck voltage regulator, a boost voltage regulator, a buck-boost voltage regulator, or a Cuk voltage regulator. Example 10 includes the apparatus of example 1, wherein one or more of: the logic, a processor, and memory are on a single integrated circuit.

Example 11 includes an apparatus comprising: logic, at least a portion of which is in hardware, to cause a modification to an output voltage of a voltage regulator in response to comparison of the output voltage with at least one of a plurality of threshold values, wherein the plurality of threshold values is to comprise an upper trigger point voltage value and a lower trigger point voltage value. Example 12 includes the apparatus of example 11, wherein the logic is to cause maintenance of the modification to the output voltage of the voltage regulator for a duration based on the comparison of the output voltage and the at least one of the plurality of the threshold values. Example 13 includes the apparatus of example 11, wherein the logic is to cause the modification to the output voltage of the voltage regulator by causing a change to a PWM (Pulse Width Modulation) signal. Example 14 includes the apparatus of example 13 comprising logic to cause a discharge of a capacitor of the voltage regulator in response to a determination that the PWM signal has maintained a same value for a period of time. Example 15 includes the apparatus of example 11, comprising logic to detect a change in the output voltage in response to transient changes to be caused by an electrical load coupled to the voltage regulator. Example 16 includes the apparatus of example 11, wherein the voltage regulator is to comprise one of: a buck voltage regulator, a boost voltage regulator, a buck-boost voltage regulator, or a Cuk voltage regulator.

Example 17 includes the apparatus of example 11, wherein one or more of: the logic, a processor, and memory are on a single integrated circuit.

Example 18 includes a computer-readable medium comprising one or more instructions that when executed on a processor configure the processor to perform one or more operations to: insert one or more pulses into an output waveform of a voltage regulator, wherein the one or more pulses are to introduce multiple frequencies into the output waveform of the voltage regulator. Example 19 includes the computer-readable medium of example 18, further comprising one or more instructions that when executed on the processor configure the processor to perform one or more operations to randomly or pseudo-randomly vary a time period between successive insertion of the one or more pulses. Example 20 includes the computer-readable medium of example 18, further comprising one or more instructions that when executed on the processor configure the processor to perform one or more operations to generate random bits, wherein the processor is to randomly or pseudo-randomly vary a time period between successive insertion of the one or more pulses based on the random bits. Example 21 includes the computer-readable medium of example 18, wherein the one or more pulses are minimum duration pulses. Example 22 includes the computer-readable medium of example 18, further comprising one or more instructions that when executed on the processor configure the processor to perform one or more operations to insert the one or more pulses in a spread spectrum.

Example 23 includes a computer-readable medium comprising one or more instructions that when executed on a processor configure the processor to perform one or more operations to: cause a modification to an output voltage of a voltage regulator in response to comparison of the output voltage with at least one of a plurality of threshold values, wherein the plurality of threshold values is to comprise an upper trigger point voltage value and a lower trigger point voltage value. Example 24 includes the computer-readable medium of example 23, further comprising one or more instructions that when executed on the processor configure the processor to perform one or more operations to cause maintenance of the modification to the output voltage of the voltage regulator for a duration based on the comparison of the output voltage and the at least one of the plurality of the threshold values. Example 25 includes the computer-readable medium of example 23, further comprising one or more instructions that when executed on the processor configure the processor to perform one or more operations to cause the modification to the output voltage of the voltage regulator by causing a change to a PWM (Pulse Width Modulation) signal. Example 26 includes the computer-readable medium of example 23, further comprising one or more instructions that when executed on the processor configure the processor to perform one or more operations to detect a change in the output voltage in response to transient changes to be caused by an electrical load coupled to the voltage regulator.

Example 27 includes a method comprising: inserting one or more pulses into an output waveform of a voltage regulator, wherein the one or more pulses are to introduce multiple frequencies into the output waveform of the voltage regulator. Example 28 includes the method of example 27, further comprising randomly or pseudo-randomly varying a time period between successive insertion of the one or more pulses. Example 29 includes the method of example 27, further comprising generating random bits and randomly or pseudo-randomly varying a time period between successive insertion of the one or more pulses based on the random bits.

Example 30 includes the method of example 27, wherein the one or more pulses are minimum duration pulses. Example 31 includes the method of example 27, further comprising inserting the one or more pulses in a spread spectrum.

Example 32 includes a method comprising: causing a modification to an output voltage of a voltage regulator in response to comparison of the output voltage with at least one of a plurality of threshold values, wherein the plurality of threshold values is to comprise an upper trigger point voltage value and a lower trigger point voltage value. Example 33 includes the method of example 32, further comprising causing maintenance of the modification to the output voltage of the voltage regulator for a duration based on the comparison of the output voltage and the at least one of the plurality of the threshold values. Example 34 includes the method of example 32, further comprising causing the modification to the output voltage of the voltage regulator by causing a change to a PWM (Pulse Width Modulation) signal. Example 35 includes the method of example 32, further comprising detecting a change in the output voltage in response to transient changes to be caused by an electrical load coupled to the voltage regulator.

Example 36 includes an apparatus comprising means to perform a method as set forth in any preceding example.

Example 37 includes machine-readable storage including machine-readable instructions, when executed, to implement a method or realize an apparatus as set forth in any preceding example.

In various embodiments, the operations discussed herein, e.g., with reference to FIGS. 1-12, may be implemented as hardware (e.g., logic circuitry), software, firmware, or combinations thereof, which may be provided as a computer program product, e.g., including a tangible machine-readable or computer-readable medium having stored thereon instructions (or software procedures) used to program a computer to perform a process discussed herein. The machine-readable medium may include a storage device such as those discussed with respect to FIGS. 1-12.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
   logic, at least a portion of which is in hardware, to insert one or more pulses into an output waveform of a voltage regulator,
   wherein the one or more pulses are to introduce multiple frequencies into the output waveform of the voltage regulator, wherein the logic is to randomly or pseudo-randomly vary a time period between successive insertion of the one or more pulses.

2. The apparatus of claim 1, comprising logic to generate random bits, wherein the logic to insert the one or more pulses is to randomly or pseudo-randomly vary a time period between successive insertion of the one or more pulses based on the random bits.

3. The apparatus of claim 2, wherein the logic to generate the random bits is to comprise a linear feedback shift register.

4. The apparatus of claim 1, further comprising a first register to store a lower trigger point value and a second register to store an upper trigger point value, wherein the logic is to vary the duration of the one or more pulses based on values stored in the first register and the second register.

5. The apparatus of claim 1, further comprising a first register to store a lower trigger point value and a second register to store an upper trigger point value, wherein the upper and lower trigger point values are to be changed randomly within limits to reduce noise.

6. The apparatus of claim 1, wherein the one or more pulses are minimum duration pulses.

7. The apparatus of claim 1, wherein the logic is to insert the one or more pulses in a spread spectrum.

8. The apparatus of claim 1, wherein the voltage regulator is to comprise one of: a buck voltage regulator, a boost voltage regulator, a buck-boost voltage regulator, or a Cuk voltage regulator.

9. The apparatus of claim 1, wherein one or more of: the logic, a processor, and memory are on a single integrated circuit.

10. An apparatus comprising:
    logic, at least a portion of which is in hardware, to cause a modification to an output voltage of a voltage regulator in response to comparison of the output voltage with at least one of a plurality of threshold values,
    wherein the plurality of threshold values is to comprise an upper trigger point voltage value and a lower trigger point voltage value, wherein a time period between successive insertion of one or more pulses into an output waveform of the voltage regulator is to be varied randomly or pseudo-randomly.

11. The apparatus of claim 10, wherein the logic is to cause maintenance of the modification to the output voltage of the voltage regulator for a duration based on the comparison of the output voltage and the at least one of the plurality of the threshold values.

12. The apparatus of claim 10, wherein the logic is to cause the modification to the output voltage of the voltage regulator by causing a change to a PWM (Pulse Width Modulation) signal.

13. The apparatus of claim 12 comprising logic to cause a discharge of a capacitor of the voltage regulator in response to a determination that the PWM signal has maintained a same value for a period of time.

14. The apparatus of claim 10, comprising logic to detect a change in the output voltage in response to transient changes to be caused by an electrical load coupled to the voltage regulator.

15. The apparatus of claim 10, wherein the voltage regulator is to comprise one of: a buck voltage regulator, a boost voltage regulator, a buck-boost voltage regulator, or a Cuk voltage regulator.

16. The apparatus of claim 10, wherein one or more of: the logic, a processor, and memory are on a single integrated circuit.

17. A computer-readable medium comprising one or more instructions that when executed on a processor configure the processor to perform one or more operations to:
    insert one or more pulses into an output waveform of a voltage regulator,
    wherein the one or more pulses are to introduce multiple frequencies into the output waveform of the voltage regulator, wherein a time period between successive insertion of the one or more pulses is to be randomly or pseudo-randomly varied.

18. The computer-readable medium of claim 17, further comprising one or more instructions that when executed on the processor configure the processor to perform one or more operations to generate random bits, wherein the processor is to randomly or pseudo-randomly vary a time period between successive insertion of the one or more pulses based on the random bits.

19. The computer-readable medium of claim 17, wherein the one or more pulses are minimum duration pulses.

20. The computer-readable medium of claim 17, further comprising one or more instructions that when executed on the processor configure the processor to perform one or more operations to insert the one or more pulses in a spread spectrum.

21. A computer-readable medium comprising one or more instructions that when executed on a processor configure the processor to perform one or more operations to:
    cause a modification to an output voltage of a voltage regulator in response to comparison of the output voltage with at least one of a plurality of threshold values,
    wherein the plurality of threshold values is to comprise an upper trigger point voltage value and a lower trigger point voltage value, wherein a time period between successive insertion of one or more pulses into an output waveform of the voltage regulator is varied randomly or pseudo-randomly.

22. The computer-readable medium of claim 21, further comprising one or more instructions that when executed on the processor configure the processor to perform one or more operations to cause maintenance of the modification to the output voltage of the voltage regulator for a duration based on the comparison of the output voltage and the at least one of the plurality of the threshold values.

23. The computer-readable medium of claim 21, further comprising one or more instructions that when executed on the processor configure the processor to perform one or more operations to cause the modification to the output voltage of the voltage regulator by causing a change to a PWM (Pulse Width Modulation) signal.

* * * * *